(12) United States Patent
Taber, Jr.

(10) Patent No.: US 8,538,735 B2
(45) Date of Patent: Sep. 17, 2013

(54) USE OF DEVICES FOR MEASURING FLUID MOVEMENT CONDITIONS AT A DISTANCE TO REDUCE THE DESIGN AND MANUFACTURING COST OF MOVING-FLUID-DRIVEN WORKING DEVICES

(76) Inventor: Wm. Stevens Taber, Jr., San Anselmo, CA (US)

( * ) Notice: Subject to any disclaimer, the term of this patent is extended or adjusted under 35 U.S.C. 154(b) by 492 days.

(21) Appl. No.: 12/807,426

(22) Filed: Sep. 2, 2010

(65) Prior Publication Data
US 2012/0010864 A1    Jan. 12, 2012

Related U.S. Application Data

(60) Provisional application No. 61/276,194, filed on Sep. 8, 2009.

(51) Int. Cl.
*G06F 17/50* (2006.01)

(52) U.S. Cl.
USPC .................................................. 703/1; 703/9

(58) Field of Classification Search
USPC ....................................................... 703/1, 9
See application file for complete search history.

(56) References Cited

U.S. PATENT DOCUMENTS

| 7,025,567 | B2 * | 4/2006 | Wobben ........................... 416/1 |
| 2009/0046289 | A1 * | 2/2009 | Caldwell et al. ............... 356/341 |

* cited by examiner

*Primary Examiner* — Dwin M Craig

(57) ABSTRACT

The present invention incorporates a device for measuring fluid movement conditions at a distance, such as LIDAR, into an underlying device for extracting useful work from a moving fluid, such as a wind turbine, for the purpose reducing the cost of designing and manufacturing the underlying device.

5 Claims, 7 Drawing Sheets

Present Invention provides a more efficient path to completing design with fewer iterations and with increased capital efficiency Design Process of a Working Device Design Process of a Working Device Range of % of Allowable Stress on Subject Component
Before Redesign Range of % of Allowable Stress on Subject Component
Within Prior Art - After Redesign Design Process of a Working Device with Present Invention Present Invention provides a more efficient path to completing design with fewer iterations and with increased capital efficiency Range of % of Allowable Stress on Subject Component
With Current Invention - No Redesign Necessary

USE OF DEVICES FOR MEASURING FLUID MOVEMENT CONDITIONS AT A DISTANCE TO REDUCE THE DESIGN AND MANUFACTURING COST OF MOVING-FLUID-DRIVEN WORKING DEVICES

CROSS-REFERENCE TO RELATED APPLICATIONS

This application claims the benefit of Provisional Patent Application No. 61/276,194 filed on Sep. 8, 2009 entitled "The Use of Devices for Measuring Fluid Movement Conditions at a Distance to Reduce the Overall Manufacturing Cost of Moving-Fluid-Driven Turbines".

BACKGROUND OF THE INVENTION

The Use of Devices for Measuring Fluid Movement Conditions to Improve the Operating Efficiency and Reduce the Maintenance Cost of Moving-Fluid-Driven Working Devices Various devices (called "Working Devices" herein; see below for definitions of this and other terms) are used to derive useful work from moving fluid streams. An example of such a Working Device is a wind turbine generator (called "WTG" herein), which is often configured with one or more blades attached to a rotating hub, with the blades configured so as to create aerodynamic lift in the moving fluid stream, causing the hub to rotate and deliver torque to operate an electric generator. In order to operate efficiently, the Working Device must be oriented optimally and must have its internal components configured optimally with respect to the fluid stream. In the case of a WTG, this implies that the axis of symmetry of the rotor must be oriented in a horizontal plane as directly as possible into the air stream and the blades must be rotated around their long axis so as to optimize the energy capture through lift and so as to mitigate the stress on the WTG components. If these are not accomplished, the WTG may "spill" usable energy in the airstream and may subject the device to excessive stress, causing premature wear and potential component failure.

In response to this need, various devices (called "Measuring Devices" herein) are used to measure fluid movement conditions (velocity, direction, turbulence, etc.) at the location of the Measuring Device. An example of such a Measuring Device is an anemometer, used to measure movement conditions in the airstream. In the case of a WTG, the anemometer is typically mounted on top of the nacelle, downstream from the rotor. This anemometer measures wind velocity, direction, and other data at the location of the anemometer and provides these data to the WTG controller, which in turn "Yaws" the WTG (i.e., rotates the WTG in a plane approximately horizontal) to face into the wind and "pitches" the rotor blades (i.e., rotates the blades around the long axis of each blade) so as to (1) obtain as much aerodynamic lift as is possible, up to the amount of lift necessary to generate the full rated power of the generator and (2) to reduce the stress on the rotor and other WTG components.

A defect in this strategy of deploying fluid Measuring Devices is that the WTG (or other Working Device) requires some time, typically a few seconds, to respond to the data acquired by the Measuring Device and adjust the orientation and internal configuration of the Working Device, so that the Working Device is unable to respond to current conditions and always remains a few seconds out of sync with the fluid movement conditions prevailing at the Working Device. In response to this need, certain Distant Measuring Devices, such as LIDAR (Light Detection And Ranging) and SODAR (Sonic Detection And Ranging), are used to measure fluid movement conditions at a distance from the Working Device and provide these data to the Working Device Controller, enabling the Working Device to be optimized with respect to the conditions prevailing at the Working Device. These Distant Measuring Devices often function by projecting a wave phenomenon such as electromagnetic radiation or sound toward the region of the moving fluid of interest, detecting a portion of the wave which is reflected back by discontinuities in the fluid (such as dust particles if the fluid is air), and measuring the Doppler shift between the outgoing and returning waves. When combined with data such as the length or frequency of the wave, the Doppler shift can be used to determine the movement conditions of the discontinuity, from which is inferred the movement conditions of the fluid in the vicinity of the discontinuity. This application is deployed expressly for the purpose of improving operational efficiency of and reducing component wear in the Working Device (U.S. Pat. Nos. 7,281,891, 7,391,506, 7,342,323, and 6,320,272 and U.S. Patent application 20090047116). Such a Distant Measuring Device does not need to be attached to or located near the Working Device, provided that the Distant Measuring Device is located so that it can measure the moving fluid that will impinge on the Working Device and communicate with the Working Device.

The Design Process of a Wind Turbine and Similar Working Devices

The design of a wind turbine or similar Working Device typically involves a process as follows: (See FIG. 1.)
1) Preliminary design, ending in an approximate configuration of the Working Device and all components. This phase may involve various optimization studies which attempt to approximate a design of the Working Device which maximizes economic value.
2) Detailed design, ending in a precise configuration of the Working Device and precise configuration and specification of all components.
3) Aeroelastic or similar modeling (called "Fluid-elastic Modeling" herein) of the detailed design.
4) Finite element analysis (FEA) of the detailed design based on the loads predicted by the Fluid-elastic Model.
5) If the FEA shows any component to be over allowable stress, iteration of steps 2 through 5.

Steps 3 and 4 involve exposing the Working Device virtually to a set of load conditions (typically several hundred load conditions) and predicting the device's behaviour (particularly its ability to withstand mechanical or structural load) in each load condition. Each load condition represents a set of environmental conditions, such as, in the case of a WTG, wind speed, wind direction, upflow angle, grid condition, etc., plus the rate and extent of change in each. The set of load conditions is intended to be a proxy for the full range of actual loads under which the Working Device will be expected to operate during its service lifetime (in the case of a WTG, typically 20 years or more). For each load condition, the designer (or, typically in the case of a WTG, design team) of the Working Device performs a Fluid-elastic Model and Finite Element Analysis of the Working Device, determining for every component in the Working Device (there are typically several hundred or more in a WTG) the % of allowable stress to which the component is exposed during the load condition in question in each of the possible failure modes (compression, tension, shear, moment, deflection, fatigue, etc.) The allowable stress is a function of the configuration of the component, the strength of the material, and the configuration of the Working Device as a whole. Therefore, in the case of a WTG, the designer of the Working Device will typically produce a 4n matrix in which the X-axis represents several hundred load conditions, the Z-axis represents several hundred components in the WTG, the W-axis contains the possible failure modes, and the Y-axis contains a datum equal to the % of allowable stress. In total, in the case of a WTG, there will usually be a few million such data. (This is easier to consider as a 3n matrix in which the Y-axis contains a histogram describing the % of allowable stress in the critical failure mode. Typically, FEA programs display stress in the critical failure mode graphically in a single visual display of the component.)

Every such datum, for every component and for every load condition, must fall at or below 100% of allowable stress in all failure modes. Any component which fails this test (see FIG. 2, load conditions 1 through 13) will be a potential source of serial defects in the Working Device when it is in commercial production, thereby increasing the manufacturers' warranty exposure and the customers' maintenance costs. Furthermore, wind turbines and other Working Devices are often sold with the benefit of a certification from a certifying agency (in the case of WTGs, typically either Germanischer Lloyd or Det Norse Veritas), and such agencies typically require that all components of the Working Device meet this test for a full range of stipulated load conditions.

As discussed above, the allowable stress of any component is a function of the configuration of the component, the strength of the material, and the configuration of the Working Device as a whole. For each component which, in any load condition, exceeds 100% of allowable stress, the designer of the Working Device has three options within prior art: First, the designer may change the configuration of the component, for example, by making it bigger. For example, a bolt which is over 100% of allowable tension loading under a certain load condition may fall below 100% of allowable tension loading if increased in diameter. However, adding mass to the component adds to the cost of the component and, more importantly, adds to the load on other components in the Working Device, potentially increasing their cost as well. Second, the designer may upgrade the strength of the material that comprises the component. For example, a WTG rotor blade made of fiberglass may have carbon fibers incorporated into the fabric to improve strength and stiffness. However, this also adds to the cost of the component and may adversely affect loads on other components. Third, the designer may reconfigure the Working Device as a whole to mitigate the failure. For example, if the FEA shows that a WTG rotor blade will deflect enough to engender tower strikes, the designer may increase the rotor camber (the angle of the rotor plane from vertical) to mitigate the possibility of tower strikes. However, reconfiguring the Working Device will change the load on other components and may cause other components to be overstressed.

Since such Working Devices are typically complex machines whose components interact functionally and structurally, it is usually necessary, within prior art, to repeat steps 2 through 5 very many times to eliminate all load conditions in which one or more components is subjected to stress in excess of 100% of allowable stress (called "Offending Load Conditions" herein). (FIG. 1A).

Furthermore, within prior art, there is an inherent limitation in the degree to which the design can be optimized. Consider for illustrative purposes a single component under the full range of load conditions; consider further that the data (% of allowable stress) for the range of load conditions is sorted by % of allowable stress. (See FIG. 2.) There will typically be a wide variation in the data. The component must be strong enough to withstand the most severe load it will ever experience, but this determining load condition is likely to be encountered only for a tiny fraction of the Working Device's service life. Thus, to survive for a tiny % of its operating conditions, the Working Device is likely to be much heavier and stronger, and therefore much more expensive, than it needs to be for all other operating conditions. (See FIGS. 2 and 3.)

(Note that this analysis concerns only load conditions under which the Working Device is operating and performing useful work. For example, WTGs are typically equipped with anemometers which measure wind speed in real time (i.e., as the wind passes over the WTG) and which enable the WTG controller to curtail operation of the WTG when the wind speed exceeds a certain maximum "cut-out" wind speed, typically 20 to 25 meters per second. Such curtailment is typically achieved either by feathering the blades, by braking the drive shaft, by causing the rotor to stall passively, or by some combination of these techniques. After cutting out, operation typically does not resume until the wind speed has dropped below the cut-out speed for a period of time; this loss of production is considered a "hysteretic" effect for purposes of the economic performance of the WTG.)

In view of the discussion above, a method for (1) reducing the number of iterations in the Working Device design process, (2) reducing or eliminating the cost of redesigning the Working Device, and (3) reducing the cost of manufacturing the Working Device as a result of the redesign would represent a significant advance in the art. The present invention provides such a method.

SUMMARY OF THE INVENTION

As discussed above, if a component of a Working Device is found during the design process to exceed 100% of allowable stress in some load condition, the designer equipped with prior art must either change the configuration of the component, upgrade the strength of the component material, or reconfigure the Working Device. The designer must then reiterate the modeling and FEA until no such Offending Load Condition exists. This process is time-consuming and labour-intensive, and it is inherently incapable of resulting an economically optimized working device.

The present invention enables the use of a virtual Distant Measuring Device during the Fluid-elastic Modeling and FEA steps in the design process. This enables the designer to actually reduce the range of load conditions for which the Working Device must be designed, resulting in the following: (1) It enables a reduction in mass and material strength, and thereby of manufacturing cost, without compromising structural integrity and at a modest or zero reduction in performance. (2) It enables a reduction in the time and cost of design, without compromising structural integrity and at a modest or zero reduction in performance. (3) It is capable of resulting in an economically optimized design.

Other objects and advantages of the present invention will be apparent from a review of the detailed description that follows.

DETAILED DESCRIPTION OF THE INVENTION

Definitions

Figure 1:
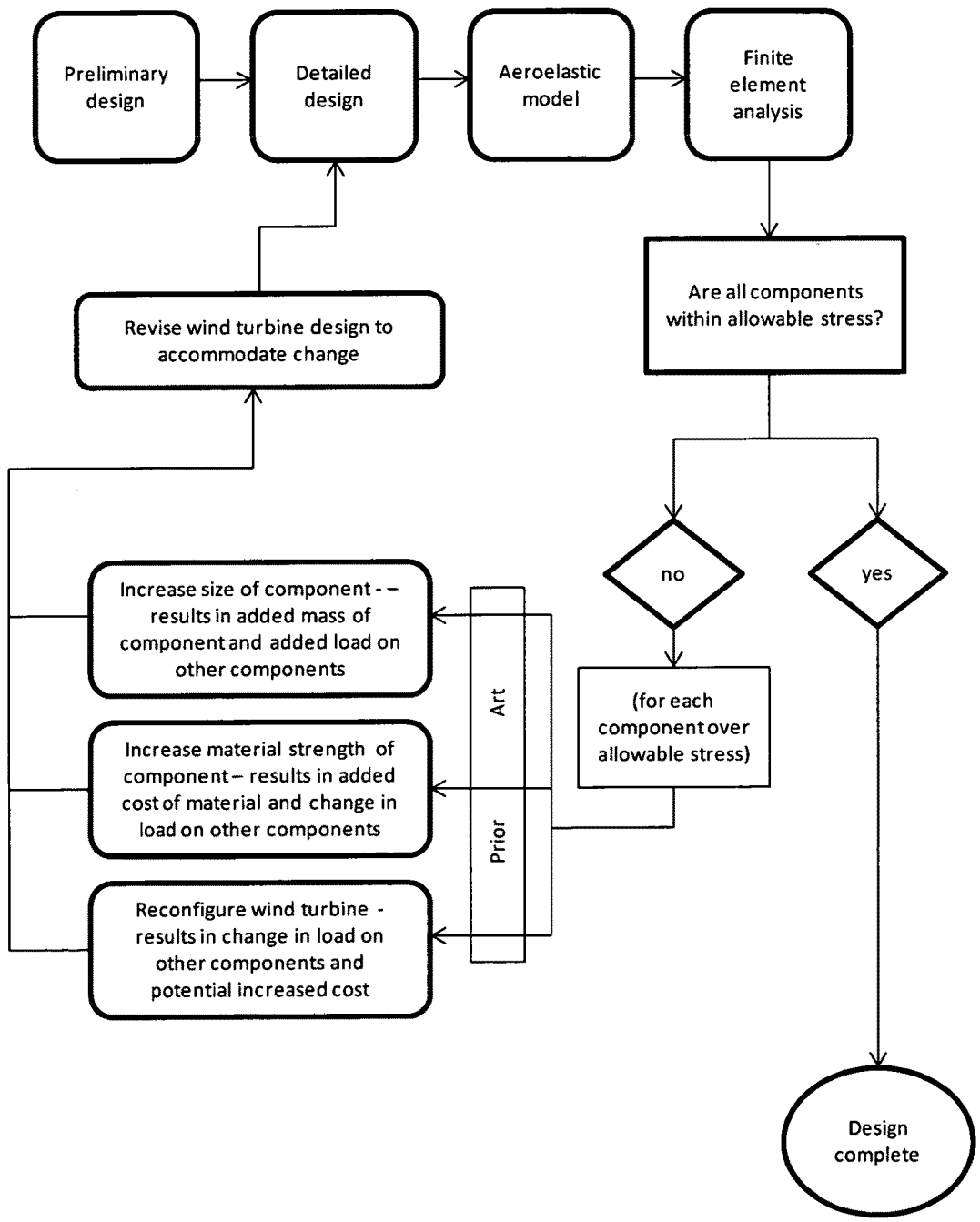
FIG. 1 is a schematic diagram illustrating the design process of a working device.

As Used Herein (Defined terms herein are capitalized.)

"Distant Measuring Device" is a Measuring Device used to measure fluid movement conditions at a location remote from the Measuring Device.

"Finite Element Analysis" or "FEA" of the design of a Working Device is the calculation of the ability of each finite element (i.e., component) of the Working Device to withstand the structural loads predicted by the Fluid-elastic Model.

"Fluid-elastic Modeling" of the design of a Working Device is the analysis of a working device under stipulated environmental conditions (such as, in the case where the moving fluid is wind, rate and rate of change in wind speed, wind upflow angle, wind Yaw angle, etc.) to determine the structural loads placed on each component of the Working Device.

"LIDAR (Light Detection And Ranging)" is a Measuring Device which projects electromagnetic radiation (typically in or near the visible spectrum) into a transparent moving fluid (such as air), detects a portion of the radiation reflected back to the Measuring Device by discontinuities in the fluid stream (such as dust particles), measures the wavelength (either inherent or induced) of both the outgoing and incoming radiation, calculates the Doppler shift to measure the movement of the discontinuities, and infers movement conditions in the fluid stream therefrom.

"Measuring Device" is a device used to measure fluid movement conditions, such as (in the case where the moving fluid is wind) wind speed, wind direction, turbulence, etc.).

"Offending (Environmental) Load (Condition)", with respect to a Working Device, is a condition under which the operation of the Working Device would result in loads which are deemed by the Designer to be excessive. For example, a load condition which results in one or more components of a Working Device being subjected to more than 100% of allowable structural stress and thereby to potential failure is an Offending Load Condition.

"Operating Parameters" of a Working Device are all characteristics of the Working Device which can be changed during operation, such as, in the case of a WTG, Yaw, Pitch, operational status, etc.

"Pitch", with respect to a blade of a WTG rotor (or a similar Working Device), is the angle in a plane perpendicular to the long axis of each blade (or, more precisely, the plane determined by the Pitch gears at the root of the blade) between a reference plane in the blade and a fixed reference plane in the nacelle. As wind speed relative to the blade airfoil varies over time and along the length of the blade, the blade Pitch may be adjusted to optimize the operation of the airfoil. "Pitch" may also mean the act of adjusting the Pitch angle, for example by actuating the Pitch motors which control the Pitch.

"SODAR (Sonic Detection And Ranging)" is a Measuring Device which projects sound (often in or near the audible spectrum) into a moving fluid (such as air), detects a portion of the radiation reflected back to the Measuring Device by discontinuities in the fluid stream (such as dust particles if the moving fluid is air), measures the wavelength of both the outgoing and incoming sound, calculates the Doppler shift to measure the movement of the discontinuities, and infers movement conditions in the fluid stream therefrom.

"Virtual Distant Measuring Device" is a Distant Measuring Device which is assumed by the designer of the associated Working Device to be incorporated into the actual Working Device.

"Working Device" is a device used to derive useful work from moving fluid streams. An example of such a Working Device is a wind turbine generator.

"Working Device Controller" is a device within a Working Device which controls its operation, for example its orientation with respect to the moving fluid and the configuration and operation of its internal components with respect to each other. In the case of a WTG, the WTG Controller may adjust the Yaw Angle and Pitch Angle of the WTG by actuating motors at the Yaw gears and Pitch gears respectively.

"WTG" is a wind turbine generator, a Working Device which captures kinetic energy from an airstream and converts it to electricity.

"Yaw", with respect to a WTG which is equipped with a rotor the axis of symmetry of which is deployed into the wind (or a similar Working Device), is the angle in a horizontal plane between the axis of symmetry of the rotor and a line of reference, which may be fixed (such as north) or may vary (such as the wind direction). In some cases, the plane in which the Yaw is measured may instead be the plane of the Yaw gears, which is usually tilted a few degrees away from horizontal so as to increase the distance between the lowermost blade and the tower to avoid tower strikes. "Yaw" may also mean the act of adjusting the Yaw angle, for example by actuating the Yaw motors which control the Yaw.

DESCRIPTION OF THE INVENTION

Figure 1A:
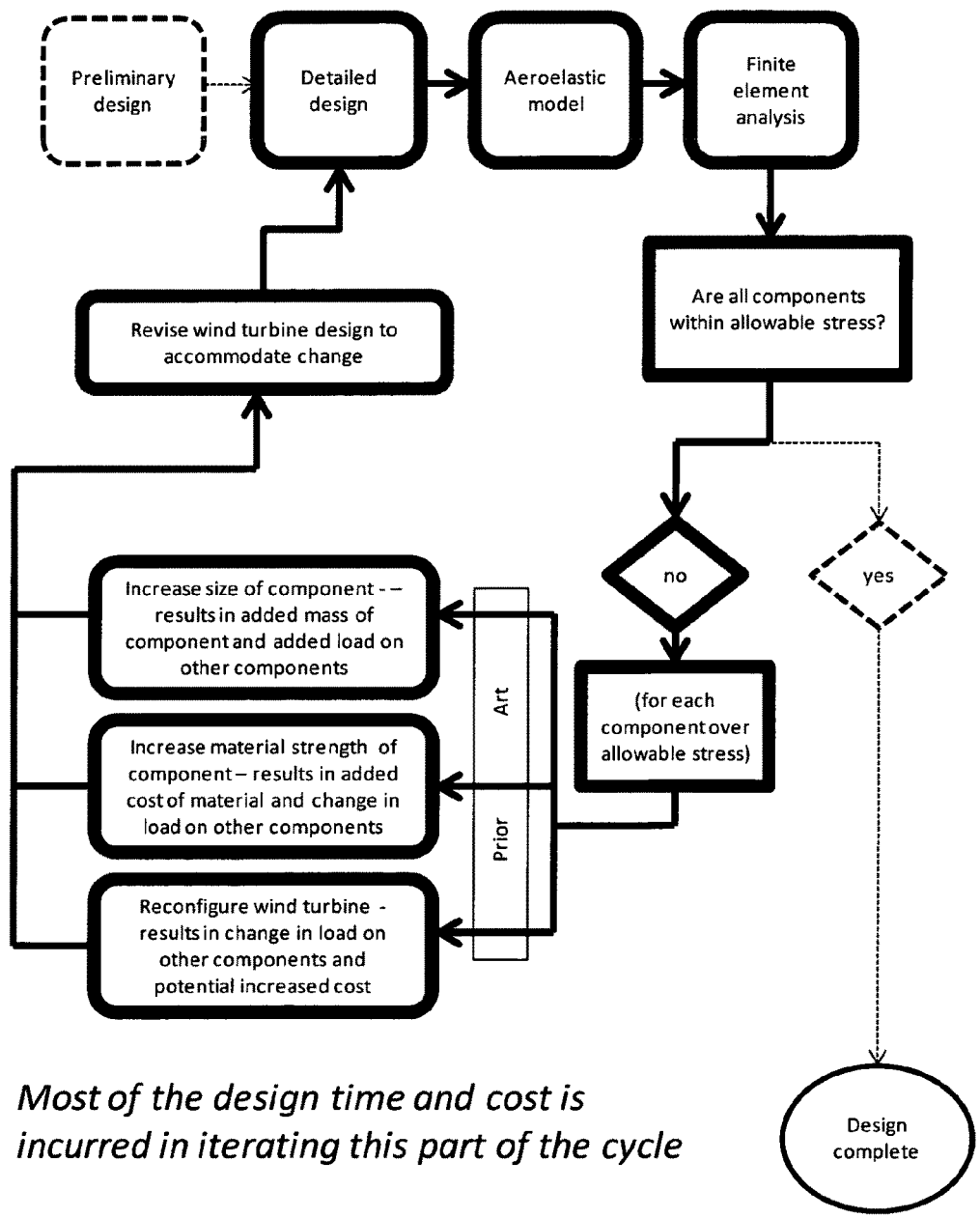
FIG. 1A is a schematic diagram illustrating the design process of a working device, emphasizing the part of the cycle which typically requires a very large number of iterations, increasing design time and cost.

Consider the circumstances noted above wherein, during the design process, a component of the Working Device in some load condition or conditions exceeds 100% of allowable stress. (See FIG. 2.) As discussed above, equipped solely with prior art, the designer has three options: change the configuration of the component, upgrade the strength of the component material, or reconfigure the Working Device. (See FIG. 1.) The implementation of one or more of these techniques and the repeated iteration of the design cycle will eventually lead to a redesigned Working Device wherein all components, in all load conditions, experience 100% or less of allowable stress. (See FIG. 3.) However, since the loads on the components are highly interactive, this process is likely to require very many iterations to achieve a successful outcome. (See FIG. 1A.)

Figure 2:
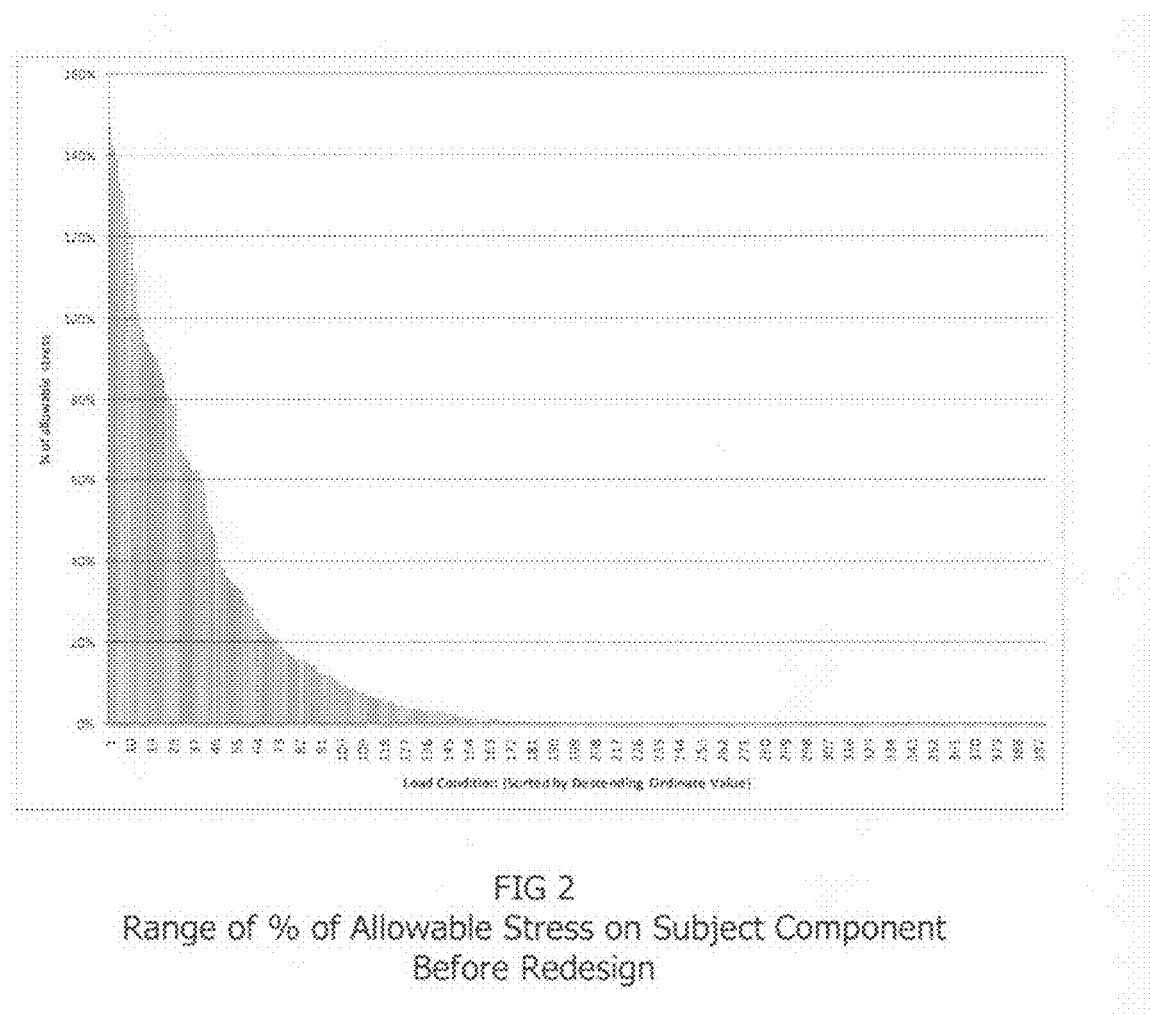
FIG. 2 is a histogram illustrating a hypothetical component in a Working Device during design. The abscissa contains the range of load conditions under which the Working Device must be demonstrated to operate safely, i.e., without component failure. The ordinate shows the range of % of allowable stress before redesign on the subject component in each of the load conditions contained in the ordinate. In this exemplary iteration of the Fluid-elastic Modeling and FEA, 13 load conditions result in stress on the component which exceeds 100% of allowable stress. For clarity in illustrating the value and novelty of the present invention, the load conditions on the abscissa are sorted in order of descending ordinate value.
Figure 3:
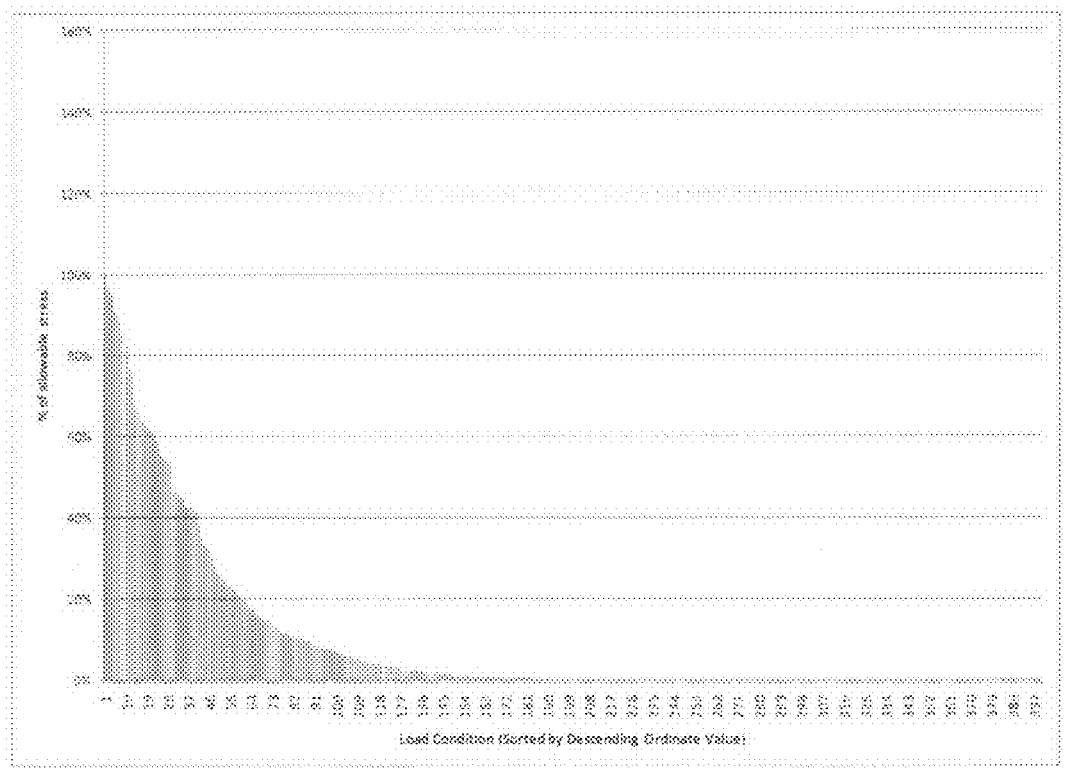
FIG. 3 is a histogram illustrating the same hypothetical component as FIG. 2, after redesign using only prior art. In this exemplary result of the repeated iterations of the Fluid-elastic Modeling, FEA, and component redesign, all Offending Load Conditions have been eliminated.
Figure 4:
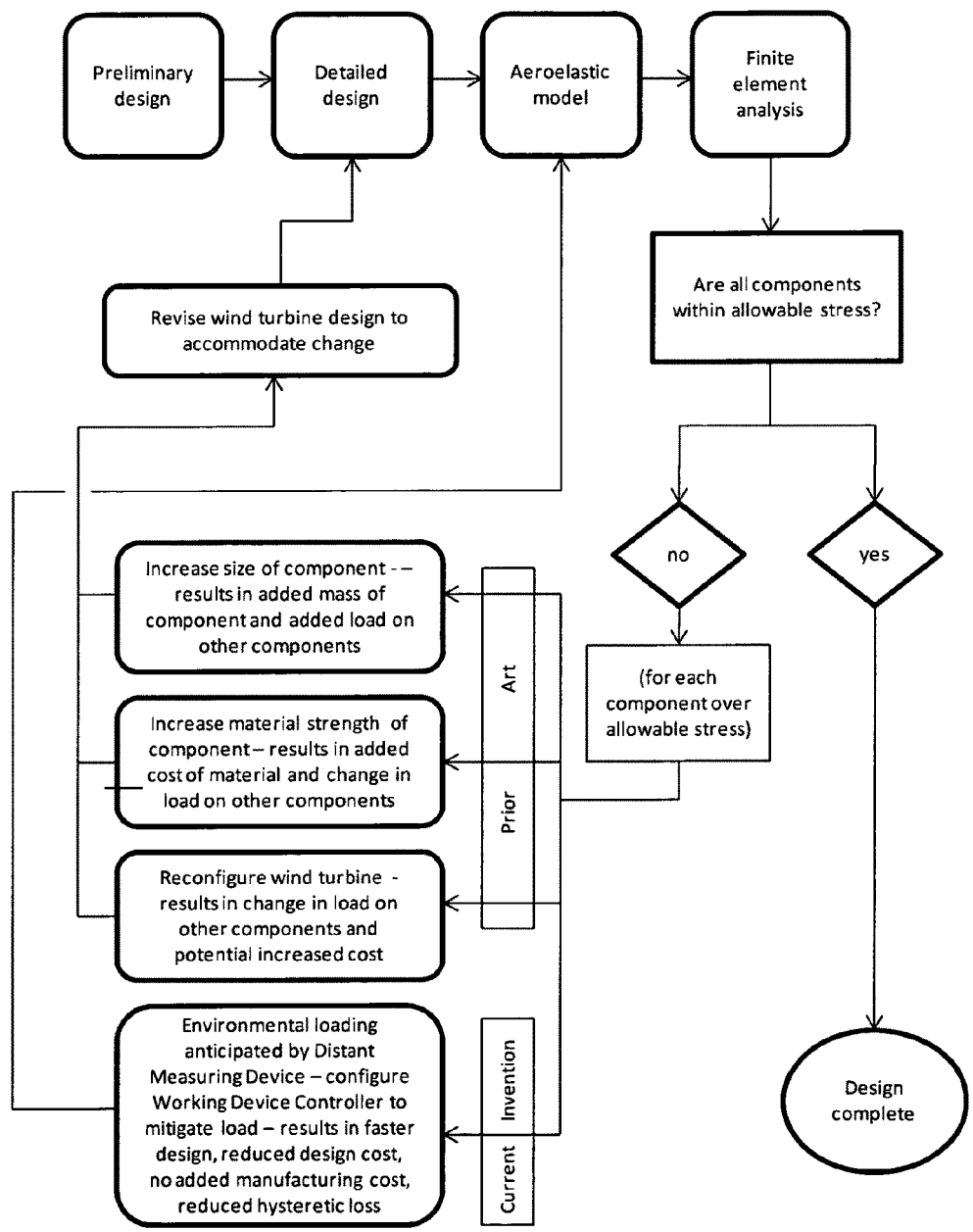
FIG. 4 is a schematic diagram illustrating the design process of a working device incorporating the present invention.
Figure 4A:
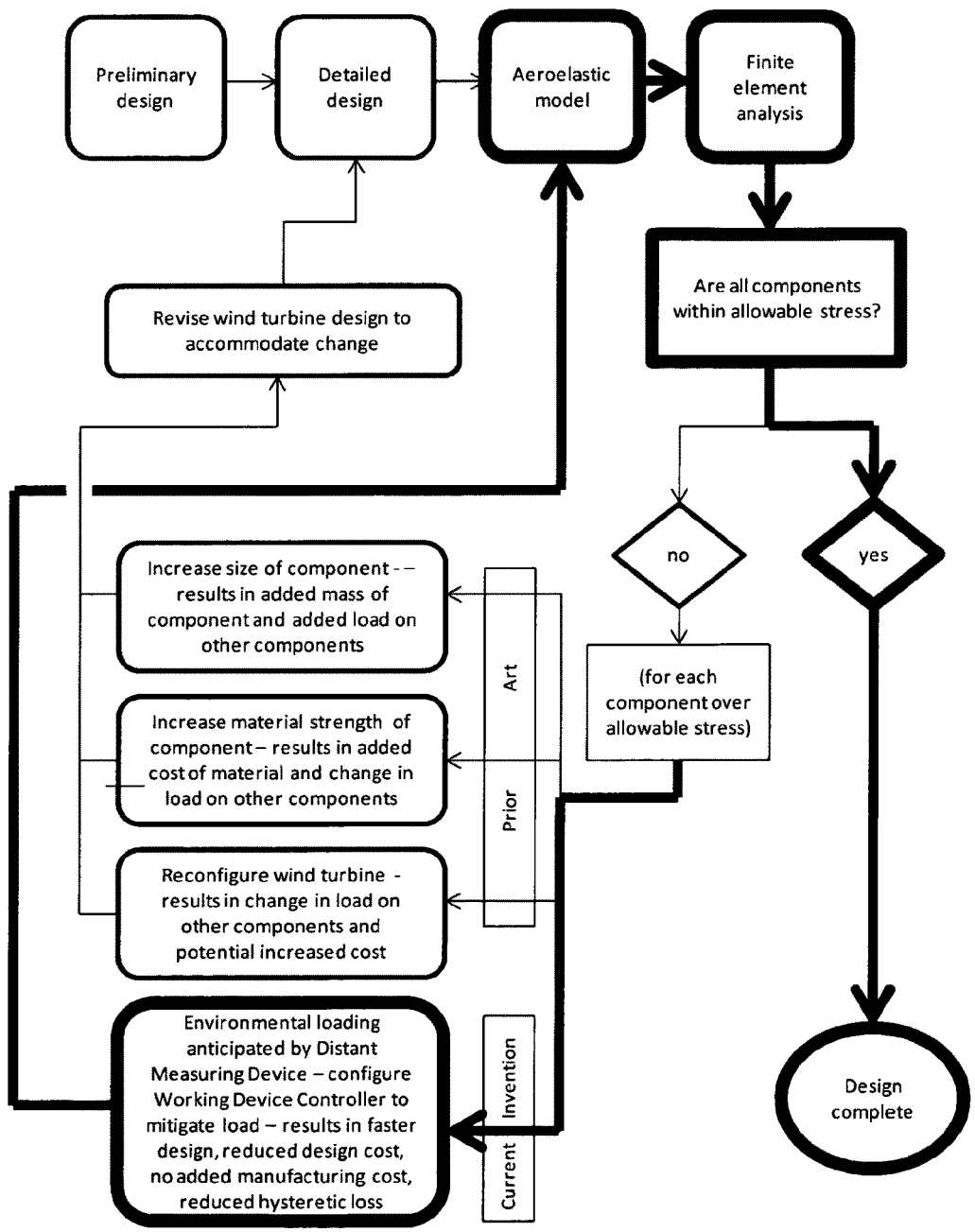
FIG. 4A is a schematic diagram illustrating the design process of a working device incorporating the present invention, emphasizing the design tool afforded by the present invention, to reduce greatly the number of repeated iterations in the design process and to increase the capital efficiency of the Working Device.
Figure 5:
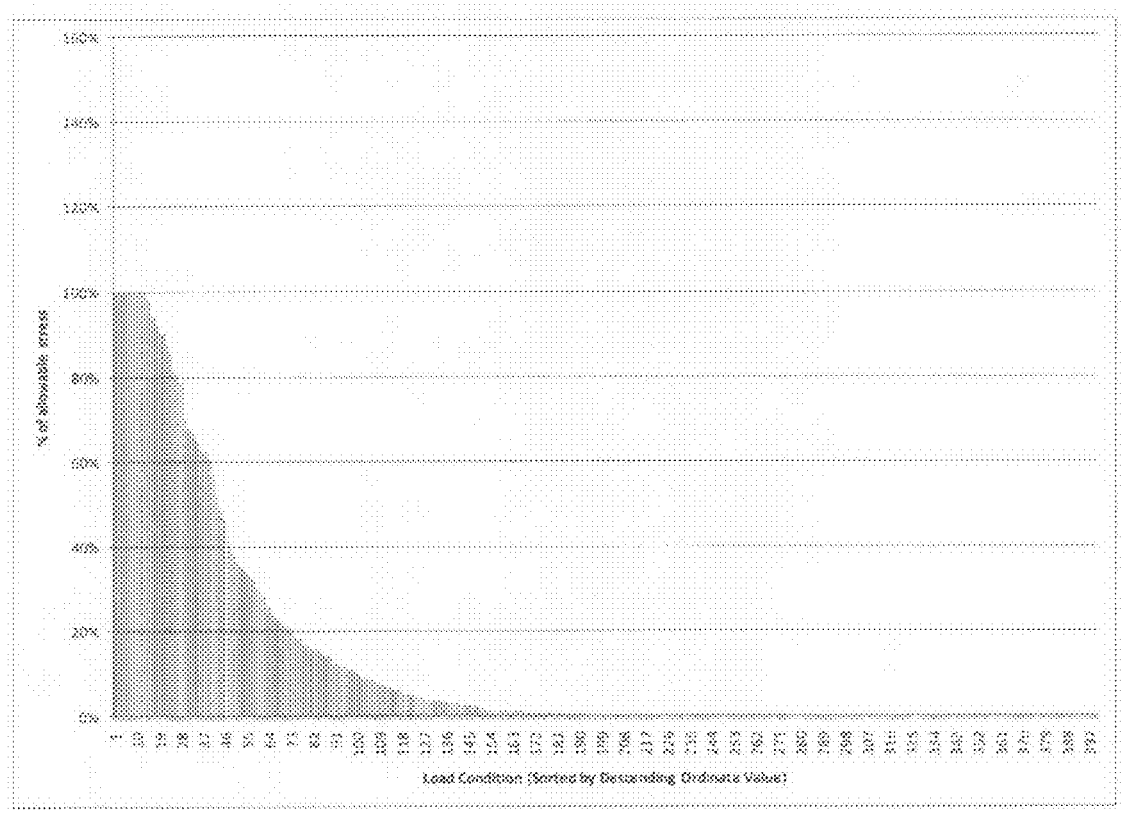
FIG. 5 is a histogram illustrating the same hypothetical component as FIGS. 2 and 3, after redesign using prior art enhanced by the present invention. In this exemplary result, note that, in addition to the fact that all Offending Load Conditions have been eliminated, the coefficient of variation in the dependent data set has been reduced, implying significantly improved efficiency in the use of capital in the design.

The present invention provides to the designer a fourth option (See FIG. 4). Since, when in operation, a Distant Measuring Device will give the Working Device Controller advance notice of the Offending Environmental Load, the designer may configure the Working Device Controller so as to curtail temporarily the operation of the Working Device or so as to adjust its operating characteristics (such as Yaw angle, Pitch angle, or another operating parameter) before the Offending Environmental Load impinges on the Working Device, in order to protect the Working Device from damage. By doing so, the designer keeps the maximum stress on the component under 100% without redesign and without changing the component (and thereby without increasing its cost). (See FIG. 5.) FIGS. 2, 3, and 5 illustrate the range of % of allowable stress experienced by a hypothetical component under all load conditions, both within prior art (FIGS. 2 & 3) and with the benefit of the present invention (FIG. 5). Note that, in this case, with the benefit of the present invention the maximum stress on the component is reduced by about ⅓ (comparing FIGS. 2 and 5), which enables the designer to reduce its load-bearing capacity (dimension or material strength) by approximately the same fraction. Since the cost of many components in a turbine is strongly correlated with mass and with material strength, this is likely to lead to a reduction in cost on the same order of magnitude. Put a different way, by reducing the outlier data, the present invention reduces the coefficient of variation in the data set, thereby improving the economic optimization of the component as utilized across the full range of load conditions. Furthermore, since the present invention mitigates the Offending Load without changing the configuration of the component, upgrading the strength of the material, or reconfiguring the Working Device, the reiteration of the Fluid-elastic Model and FEA is likely to yield a successful outcome much more quickly than solely with prior art, reducing the cost and time of design and better preserving the optimization intent of the preliminary design.

Economic Effect of the Present Invention

The economic effect of the present invention on the Working Device is illustrated in the case of a WTG as follows:

The most salient figure of merit in determining the economic value of a WTG is the cost of the energy produced in operation over the service life of the WTG. Since, in most cases, the "fuel" for the WTG is free (the wind), the cost of energy produced is related very strongly to the capital cost of the WTG. (As a rule of thumb commonly used in the wind industry, about 90% of the cost of energy produced results from the amortization of the initial capital cost and about 10% from ongoing operating and maintenance costs.) Thus, a ⅓ reduction in capital cost will engender a reduction in the cost of energy produced of approximately 30%.

This is a very important point. In the case of a Working Device which consumes fuel, the designer should make trade-offs between the capital cost of the device and the expected cost of fuel, for example increasing the capital cost if the savings in expected fuel costs justifies it. On the other hand, since the "fuel" of a WTG is free, optimizing energy capture (that is, "fuel efficiency") in a WTG is irrelevant; the designer must instead optimize only the deployment of capital. This is precisely the central purpose of the present invention, and one which is significantly advanced by the present invention.

In many industries which utilize Working Devices, such as the wind power industry, the technologies deployed are relatively mature and widely deployed. For example, the wind industry in the US added 9,994 GW of wind power generation (ref: Wiser, Ryan, et al, 2009 Wind Technologies Market Report, Lawrence Berkeley National Laboratory, August 2010), representing over US$2 billion in capital investment. Even a small increase in the utilization of this capital plant would represent significant economic value.

Exemplary Deployment

As an example of the deployment of the present invention, consider the following:

A WTG designer completes the preliminary design of a WTG with the following predicted characteristics:

- 90 meter diameter, 3-bladed, horizontal axis rotor attached to a rigid hub
- 3-stage planetary gearbox, mass: 20,000 KG
- permanent magnet generator with a 3 MW nominal capacity, capable of variable speed operation
- tower height: 80 meters
- towertop mass: 100,000 KG
- certified for operation in IEC Wind Class 2A by a major certification agency
- capacity factor in Class 2A wind: 32%
- selling price: US$3,600,000
- installed cost to the WTG owner: US$6,000,000
- equipped with LIDAR, deployed for the purpose of optimizing power production and reducing component wear in operation, in accordance with prior art In considering whether to put the WTG into commercial production the WTG designer posits a hypothetical third party WTG owner who would purchase the WTG and install it, for the purpose of generating and selling electric power, under the following circumstances:

- capacity factor: 32%
- revenue: US$80 per MWh
- operating costs: 10% of revenue With these characteristics, the WTG would return an unleveraged return on capital to its owner of 10.09%, as shown below:

| | |
|---|---|
| nominal generating capacity (KW) | 3,000 |
| hours per year | 8,760 |
| capacity factor | 32% |
| per MWh unit gross revenue | US $80 |
| gross to net revenue | (1-10%) |
| capital cost | US $6,000,000 |
| unleveraged return on capital | 10.09% |

The designer determines that the WTG would be competitive with other competing WTGs if subjected to a similar analysis and deems that the hypothetical WTG purchaser would find a 10% unleveraged return marginally acceptable and would therefore consummate the purchase. On the strength of this analysis, the designer proceeds to detailed design, aeroelastic modeling, and FEA.

However, during FEA, the designer finds that, in load conditions representing 0.5% of the operating hours of the WTG in a Class 2A wind (weighted by the WTG power curve), certain components in the gearbox are stressed in excess of their bearing strength. If uncorrected, this would deprive the WTG of certification, making it unacceptable to industry lenders, mechanically unreliable for the owner, and posing unacceptable risk of warranty claims to the manufacturer. To correct this, the Designer, equipped with prior art, may consider the following options:

- degrade the Wind Class certification to 3A, thereby reducing the capacity factor to 25%
- reduce the rotor diameter to 70 meters, thereby reducing the generating capacity to 2 MW
- increase the material strength of the overstressed gearbox components, thereby increasing the installed cost to $6,500,000
- increase the size of the overstressed gearbox components, thereby increasing the towertop mass to 120,000 KG, which in turn increases the stress on, and therefore the mass of, the frame, bed, tower, and foundation, and increases the load on, the therefore the cost of, the crane used to install the WTG and the trucks used to ship it, all of which increases the installed cost to $7,000,000

Note that arriving at all these potential redesigns would require multiple iterations of aeroelastic modeling and FEA.

These options, if implemented, would result in the following unleveraged return on capital to the WTG owner:

|  | option | | | |
| --- | --- | --- | --- | --- |
|  | 1 | 2 | 3 | 4 |
| nom gen cap (KW) | 3,000 | 2,000 | 3,000 | 3,000 |
| hours per year | 8,760 | 8,760 | 8,760 | 8,760 |
| capacity factor | 25% | 32% | 25% | 25% |
| per MWh rev | US $80 | US $80 | US $80 | US $80 |
| gross to net | 90% | 90% | 90% | 90% |
| capital cost | $6 m | $6 m | $6.5 m | $7 m |
| unlev ret on cap | 7.88% | 6.73% | 9.32% | 8.65% |

The designer determines that the WTG would not be competitive with other competing WTGs under these circumstances and in any case would not deliver to the WTG owner the marginally acceptable 10% unleveraged return. On the strength of this analysis, the designer equipped with prior art would determine that the WTG is not commercially viable and would not put it into production.

However, equipped with the present invention, the designer would know that the LIDAR would recognize the Offending Load Conditions well before they impinged on the rotor and would configure the WTG controller logic so that, when the Offending Load Conditions reach the WTG, the blades have been feathered so that the aerodynamic lift which induces the Offending Loads is reduced to acceptable levels. Assuming, conservatively, that the energy production during this period would drop 50%, the WTG would return an unleveraged return on capital to its owner of 10.07%, as shown below:

| | |
| --- | --- |
| nominal generating capacity (KW) | 3,000 |
| hours per year | 8,760 |
| capacity factor | 31.92% |
| per MWh unit gross revenue | US $80 |
| gross to net revenue | (1-10%) |
| capital cost | US $6,000,000 |
| unleveraged return on capital | 10.07% |

Note that this solution requires a modification to the WTG controller logic but does not require the redesign, upsizing, or upgrading of any component of the WTG.

The designer determines that the WTG would be competitive with other competing WTGs under these circumstances and would deliver to the WTG owner the marginally acceptable 10% unleveraged return. On the strength of this analysis, the designer equipped with the present invention would determine that the WTG is commercially viable and would put it into production.

The examples and embodiments described herein are for illustrative purposes only. Various modifications or changes in light thereof will be suggested to persons skilled in the art and are included within the spirit and purview of this application and are considered within the scope of the appended claims. All publications, patents, and patent applications cited herein are hereby incorporated by reference in their entirety for all purposes.

What is claimed is:

1. A computerized method of designing a working device that contains a plurality of components comprising;
    generating a load model of the working device;
    incorporating into the load model a virtual distant measuring device;
    if at least one offending environmental load condition is generated based on data obtained from the model of said working device;
    simulating a temporary modification in the operation of said working device in order to negate the effects of an offending environmental load condition;
    and reconfiguring the operation of said working device such that at least one of the following characteristics; configuration, size, placement, and material strength; of at least one of said components of said working device will remain unchanged.

2. The computerized method of claim 1 further comprising; wherein the virtual distant measuring device is either a (Light Direction and Ranging) LIDAR device or a (Sonic Direction and Ranging) SODAR device.

3. The computerized method of claim 1 further comprising; wherein the working device is a wind turbine.

4. The computerized method of claim 1 further comprising; wherein the distant measuring device is located remotely from the Working Device.

5. The computerized method of claim 1, wherein the distant measuring device is located outside the earth's atmosphere.

* * * * *